(12) United States Patent
Yoon et al.

(10) Patent No.: US 11,496,366 B2
(45) Date of Patent: Nov. 8, 2022

(54) COMPLIANCE DETECTION OF GRATITUDE-BASED MESSAGE

(71) Applicant: APPLIED GRATITUDE INC., New York, NY (US)

(72) Inventors: Michael Yoon, New York, NY (US); Brendan Kamm, New York, NY (US)

(73) Assignee: APPLIED GRATITUDE INC., New York, NY (US)

( * ) Notice: Subject to any disclaimer, the term of this patent is extended or adjusted under 35 U.S.C. 154(b) by 283 days.

(21) Appl. No.: 15/930,750

(22) Filed: May 13, 2020

(65) Prior Publication Data
US 2020/0387911 A1 Dec. 10, 2020

Related U.S. Application Data

(60) Provisional application No. 62/857,039, filed on Jun. 4, 2019.

(51) Int. Cl.
| | |
|---|---|
| *H04L 41/0893* | (2022.01) |
| *G06Q 30/00* | (2012.01) |
| *G06Q 10/10* | (2012.01) |
| *G06Q 30/06* | (2012.01) |
| *G06F 9/54* | (2006.01) |
| *H04L 9/40* | (2022.01) |

(Continued)

(52) U.S. Cl.
CPC .......... *H04L 41/0893* (2013.01); *G06F 9/546* (2013.01); *G06F 16/285* (2019.01); *G06F 21/6227* (2013.01); *G06Q 10/107* (2013.01); *G06Q 30/0185* (2013.01); *G06Q 30/0633* (2013.01); *H04L 51/23* (2022.05); *H04L 63/123* (2013.01); *H04L 63/20* (2013.01); *G06Q 50/265* (2013.01); *H04L 2101/37* (2022.05)

(58) Field of Classification Search
CPC .. H04L 41/0893; H04L 63/20; G06F 21/6227
See application file for complete search history.

(56) References Cited

U.S. PATENT DOCUMENTS

| 8,799,482 B1 | 8/2014 | Stamos | |
|---|---|---|---|
| 2007/0156659 A1* | 7/2007 | Lim | ..................... H04L 41/0893 |

(Continued)

OTHER PUBLICATIONS

International Search Report and Written Opinion dated Aug. 25, 2020 with was issued in connection with a counterpart application PCT/US20/36025.

*Primary Examiner* — Kyung H Shin
(74) *Attorney, Agent, or Firm* — Buckley, Maschoff & Talwalkar LLC (57) ABSTRACT

Provided are systems and methods for detecting whether an electronic gift violates compliance of the sender or the recipient. The system may rely on company-specific compliance rules. In addition, the system may enrich or compensate for missing company-specific rules with general industry compliance rules. In one example, the method may include identifying a domain name of a message associated with a transfer of value from a sender to a recipient, detecting one or more requirements that are associated with the domain name identified from the message, determining that the transfer of value is a possible violation of a requirement from among the one or more requirements that are associated with the domain name based on content of the requirement, and displaying information about the requirement.

18 Claims, 8 Drawing Sheets

(51) Int. Cl.
  *G06F 16/28* (2019.01)
  *H04L 51/23* (2022.01)
  *G06F 21/62* (2013.01)
  *G06Q 50/26* (2012.01)
  *H04L 101/37* (2022.01)

(56) References Cited

U.S. PATENT DOCUMENTS

2014/0164178 A1  6/2014  Adjaoute
2017/0206545 A1  7/2017  Gupta et al.

* cited by examiner

Company A Policy 422

"Business courtesies (i.e., meals and gifts) such as food, beverage, entertainment and travel are accepted business practices and may be provided and accepted in accordance with the company's policies and procedures. Company believes that decisions about products and services should be made in the best interests of clients and we do not try to earn business by ordering and accepting business courtesies as improper inducements to decision making."

General Industry Policy 432

"A conflict of interest may arise when you or an immediate family member accepts a gift or favor from any person or organization who is a competitor, supplier, contractor, supplier, customer, and the like . . . you shall not accept any gift, ticket, entertainment or travel, from a competitor, supplier, customer or contractor having a value in excess of more than $150 unless a representative from the other organization is present . . . even if the representative is present the gift should be reasonable . . ."

COMPLIANCE DETECTION OF GRATITUDE-BASED MESSAGE

This application claims the benefit under 35 USC § 119(e) of US Provisional Patent Application No. 62/857,039, filed on Jun. 4, 2019, the entire disclosure of which is incorporated herein by reference for all purposes.

BACKGROUND

Corporate compliance requires that an organization and its employees follow the laws, regulations, standards, rules, and ethical practices that apply to the organization. Effective corporate compliance may cover internal policies as well as federal and state laws. Enforcing corporate compliance can help an organization prevent and detect violations of rules. This can save an organization from fines and lawsuits, Corporate compliance also lays out expectations for employee behavior, helps employees stay focused on an organization's broader goals, and helps operations run smoothly. This process should be ongoing. Most organizations establish a corporate compliance program to help govern policies and compliance.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

Mobile applications and websites may provide users the ability to send items of gratitude (e.g., a gifts, etc.) via electronic means such as email, text message, or the like. In this scenario, a sender may send the gift and/or a recipient may receive the gift using their employment/organization's domain (e.g., email address, phone number, etc.) Therefore, these transfers can trigger compliance requirements. However, compliance requirements may be confusing, difficult to find, or unavailable (e.g., the recipient's compliance requirements may be unavailable to the sender, etc.)

The example embodiments are directed to a system which can detect a potential compliance rule that is associated with a gift transfer between a sender and a recipient. The system may output the relevant compliance rules for display on the screen of the sender's device thereby enabling the sender to review and determine whether they violate the compliance rules. In some embodiments, the system may determine whether the gift is a compliance violation. Here, the system may identify and notify senders and recipients of relevant compliance information associated with a gift request message to prohibit compliance violations by the sender and/or the recipient. Furthermore, the system may prevent the gift/message from being delivered to the recipient if there is a violation of compliance and request approval of the gift from an administrator, etc.

Thus, the system can prevent users from violating compliance rules and policies when they send and/or receive gifts (e.g., via an organization's domain which has compliance requirements). In some cases, the system may detect organization-specific compliance requirements that are relevant to item of value being transferred. However, in some cases, the system may be unable to detect the organization-specific compliance requirements if they are not available or if they are ambiguous. In this example, the system may supplement or replace the organization-specific compliance requirements with more general industry-related compliance requirements or default rules built into the system. The substitute compliance requirements may be based on compliance requirements of other organizations in a similar industry (e.g., financial, law, education, law enforcement, government, etc.)

The system may provide users with the ability to send and receive items of value using a mobile number, an email, or the like. When a sender selects an item of value to send (e.g., a cup of coffee, a gift card, a pair of tickets to an event, a cash card, etc.), the system can retrieve compliance information that is associated with the sender and/or the recipient based on a domain name of the email address of the sender or the recipient which may be added to the message or previously stored in the system (in the case of a text message, etc.). The system may use the domain name to identify any relevant compliance policies associated with the item of value for that domain. For example, the system may identify a domain associated with the sender and/or the recipient and retrieve any compliance data associated with these domains. If there is no domain-specific information available, the system may fall back to an industry, field, etc., of the domain and retrieve related compliance policy information from other similar domains (in a similar industry, field, etc.)

The system may allow users to select and send curated gifts which are categorized with a tag value, or the like, representing a category of the gift (e.g., food, alcohol, entertainment, coffee, etc.). As another example, the gift may be described within a message of free-text. In this scenario, the system may identify the item of value being sent using various algorithms such as heuristics, expert rules (algorithm), machine learning, word analysis, natural language processing, and the like. The system may correlate the identified keyword to a category or to a relevant compliance policy/rule.

One of the objectives of the system is to support platform users/customers to be compliant with both their sending policy (company they work at) as well as the recipient policy (recipient's company). It starts with the ability to be aware and inform the sender when they are about to make a gift to a recipient of any violations of compliance on sender or recipient side. Further, the system may output information about the compliance policy to the sender and/or the recipient thereby letting them see for themselves if they are violating any compliance rules.

Figure 1A:
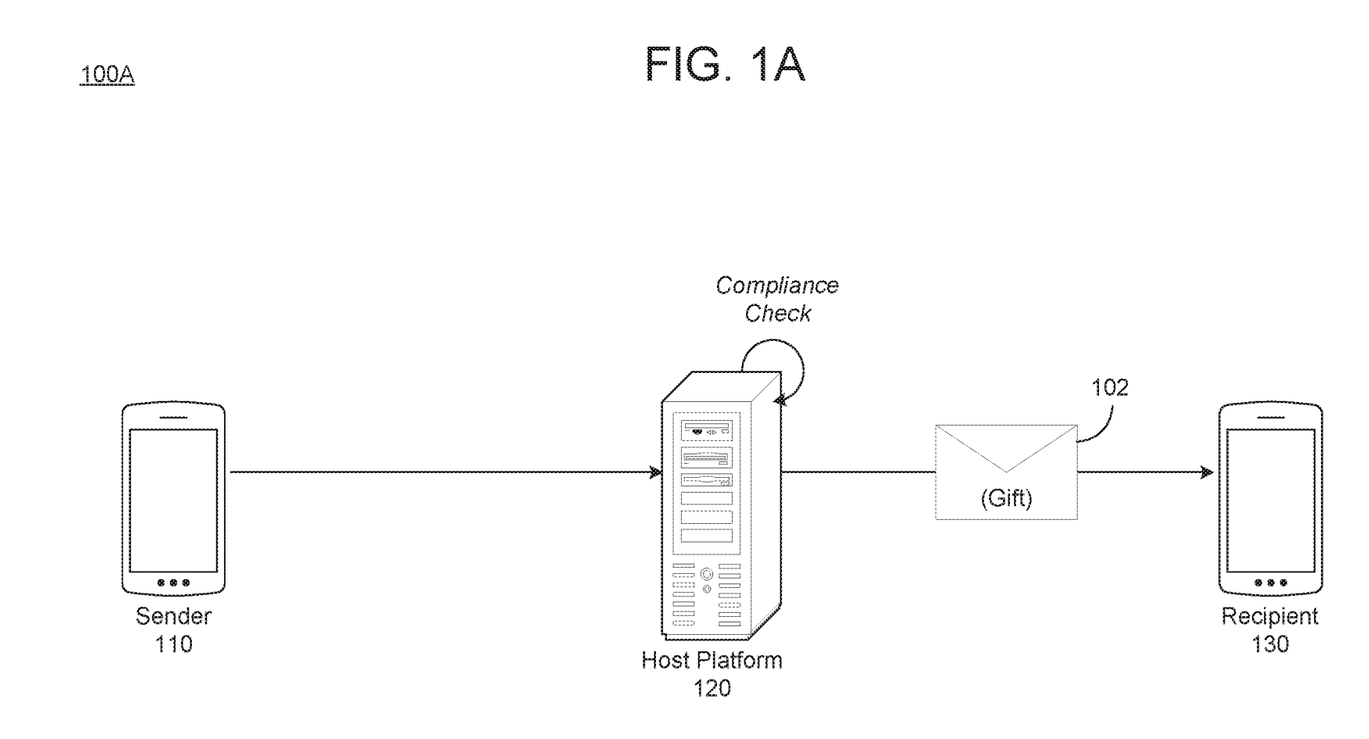
FIG. 1A is a diagram illustrating a host platform detecting compliance information associated with a gratitude-based message according to example embodiments.

FIG. 1A illustrates a host platform 120 detecting compliance information associated with a gratitude-based message 102 transmitted from a sender 110 to a recipient 130 according to example embodiments. Referring to FIG. 1A, the sender 110 may access the host platform 120 via a network (e.g., via a website/browser, a mobile application, etc.). In this example, the sender 110 and the recipient 130 may correspond to computing devices such as mobile phones, laptops, tablets, personal computers, workstations, and the like. Meanwhile, the host platform 120 may be a host server, a cloud platform, a database, and/or the like. The sender 110, the recipient 130, and the host platform 120 may be connected to each other via a network such as the Internet, a private network, or the like. In some embodiments, the host platform 120 may host a mobile application, a website, or the like, which allows users to buy and send gifts to others via email, text message, etc.

The sender 110 may create and send the gratitude-based message 102 via the host platform 120. Here, the host platform 120 may provide a user interface which allows the sender 110 to select a gift, one or more recipients, add message content, select a transmission means (e.g., email, text, etc.) and send the gratitude-based message 102 to the recipient 130. In some cases, the sender 110 may register with the host platform 120 using an email address of the sender 110. As another example, the sender 110 may include their email address (and the email address of the recipient 130) in the gratitude-based message 102.

The gratitude-based message 102 may include an item of value that is in electronic form such as a gift card, a coupon, a ticket, a voucher, or the like, which is submitted via email, instant message, text message, etc. In some embodiments, the host platform 120 may host a service, a website, a mobile application, or the like, which users can register to with to send and receive gifts via electronic means. During a registration process, the sender 110 and/or the recipient 130 may provide the host platform 120 with respective email addresses. The sender 110 may access the host platform 120, via a user interface, and select the gift to be included in the gratitude-based message 102 as well as the recipient 130. The recipient 130 may be selected from a contacts list, etc., but the embodiments are not limited thereto.

When the user selects the gift, a compliance detection and notification process may be performed to determine a compliance policy (e.g., an internal policy of an organization, a general policy of an industry, a default policy provided by the host platform 120, or the like) that is associated with the gift. In this example, the host platform 120 may identify a domain name of the sender 110 and/or the recipient 130. The host platform 120 may identify compliance rules that are associated with the domain of the sender 110 and/or the recipient. For example, organizations may provide web-based endpoints with compliance information that are accessible to the host platform 120. As another example, the host platform 120 may build compliance rules for different industries such as financial, government, medical, education, etc., based on typical rules of organizations in such industries.

The host platform 120 may identify a gift category or type associated with the gratitude-based message 102 and map the category to a compliance rule that is associated with the sender 110 and/or the recipient 130. The host platform 120 may compare the content of the gift with the content of the mapped compliance rule(s) to determine whether the gift maps to the compliance rule. As a non-limiting example, the gift may include tickets to a sporting event. The host platform 120 may detect that a cost of the tickets are $400. In this example, the host platform 120 may detect a compliance rule of the sender 110 or the recipient 130 that prevents gifts of over $150. In this case, the host platform 120 may notify the sender of the compliance rule. Furthermore, in some embodiments, the host platform may go a step further and prevent the gratitude-based message 102 including the gift from being transferred to the recipient 130. The host platform 120 may cancel the gift or take additional steps to get approval for the gift. For example, the host platform 120 may reroute the gratitude-based message 102 (or content thereof identifying the gift) to an administrator terminal for approval. Upon receiving such approval, the host platform 120 may allow and route the gratitude-based message 102 to the recipient.

Figure 1B:
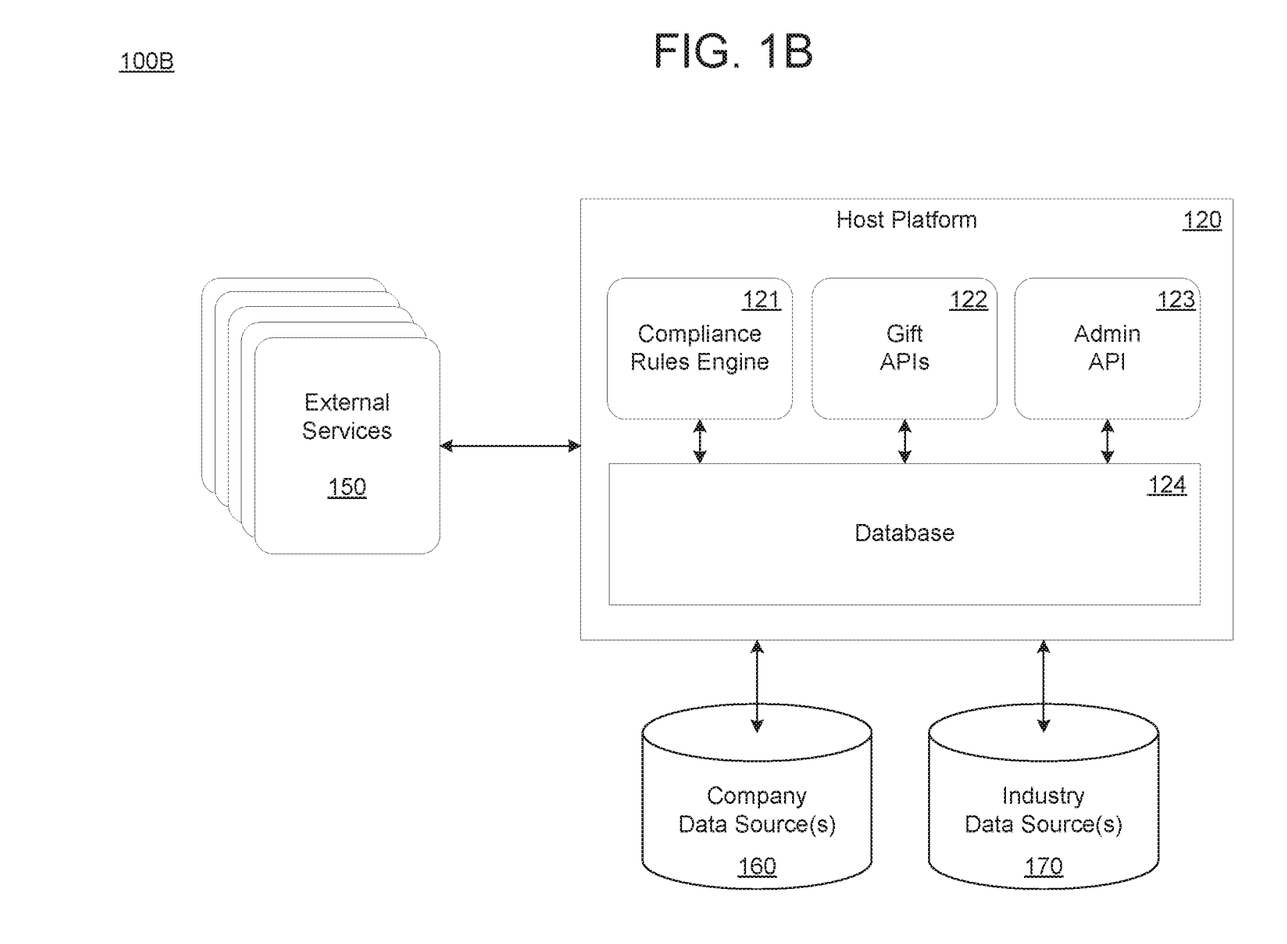
FIG. 1B is a diagram illustrating an architecture of the host platform of FIG. 1A according to example embodiments.

FIG. 1B illustrates an architecture of the host platform 120 of FIG. 1A, according to example embodiments. Referring to FIG. 1B, the host platform 120 may include a compliance rules engine 121, one or more gift-based application programming interfaces (APIs) 122, an admin API 123, and a database 124. The host platform 120 may also include other components that are not shown such as a microprocessor, network communication means (interface, card, etc.), and the like. In some embodiments, the host platform 120 may interact with one or more external services 150 which provide gifts such as online marketplaces (gift cards), coffee shops, restaurants, stores, ticket services, and the like.

Figure 4A:
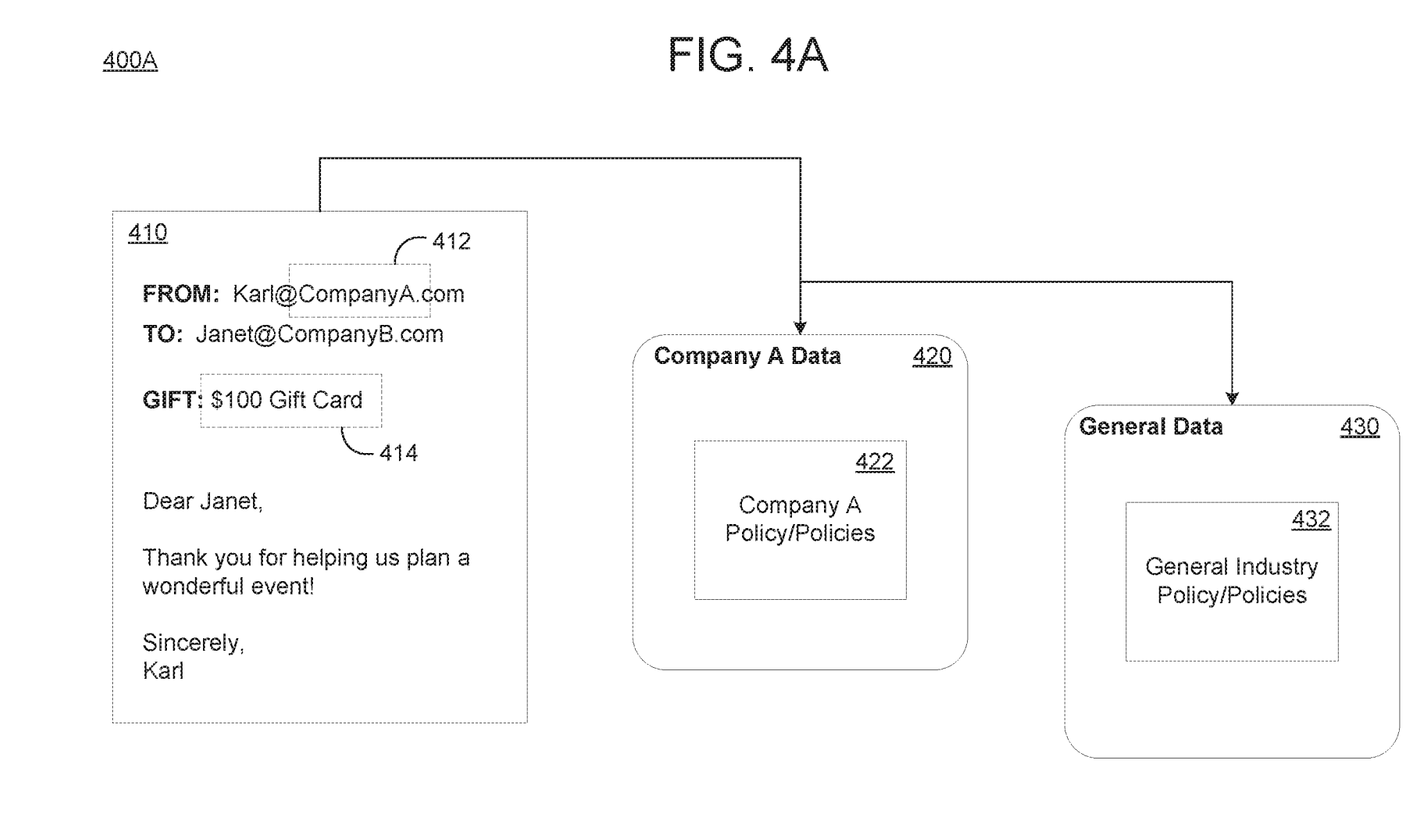
FIG. 4A is a diagram illustrating a process of determining compliance information associated with a gift according to example embodiments.

The database 124 may store the compliance rules and also mappings of gift categories to compliance rules as further explained in the description of FIG. 4A. The database 124 may acquire compliance rules from endpoints such as company-specific data sources 160 and/or industry-related data sources 170. The company-specific data sources 160 may include compliance data of the domain where the sender 110 and/or the recipient 130 are employed. The industry data sources 170 may include other company data sources or generic data sources that are published and accessible on the web. For example, financial regulations, government regulations, education regulations, and the like, may include general compliance information which can be used to supplement or stand in the place of company-specific compliance information. The compliance data from endpoints associated with the company data sources 160 and/or the industry data sources 170 may be gathered and stored in the database 124 on a periodic basis.

The gift-based APIs 122 may allow a user to access their data stored in the database 124 and the gift services 150. Through the gift-based APIs 122, the user may send a gift by SMS, email, etc., accept or donate a gift, regift a gift, see a status of a gift, and the like. The gift-based APIs 122 may include other customer-related APIs that allow the user to signup, login, authenticate, update their account, add a payment card, and the like. Meanwhile, the admin API 123 may provide access to analytics that are generated and stored in the database 124. Furthermore, the admin API 123 may allow access and modifications to rules, policies, user groups, gift categories, gift codes, etc. that are stored in the database 124.

Referring to FIGS. 1A and 1B, the sender 110 may interact with a gift-based API 122 to select a gift provided by one of the external services 150. In response, the compliance rules engine 121 may perform a compliance check based on compliance policy data that is stored within the database 124. The compliance check may identify any compliance rules associated with the type of gift to be provided from the sender 110 to the recipient 130. Furthermore, the compliance check may attempt to verify that the gift does not violate any compliance rules associated with the sender 110 and/or the recipient 130. If it does, the compliance rules engine 121 may prevent the message/gift from being sent and retrieve approval from an administrator via the admin API 123, or the like. Here, the host platform 120 may transmit information about the gift to an administrator system and receive approval/denial from the administrator system.

Figure 2:
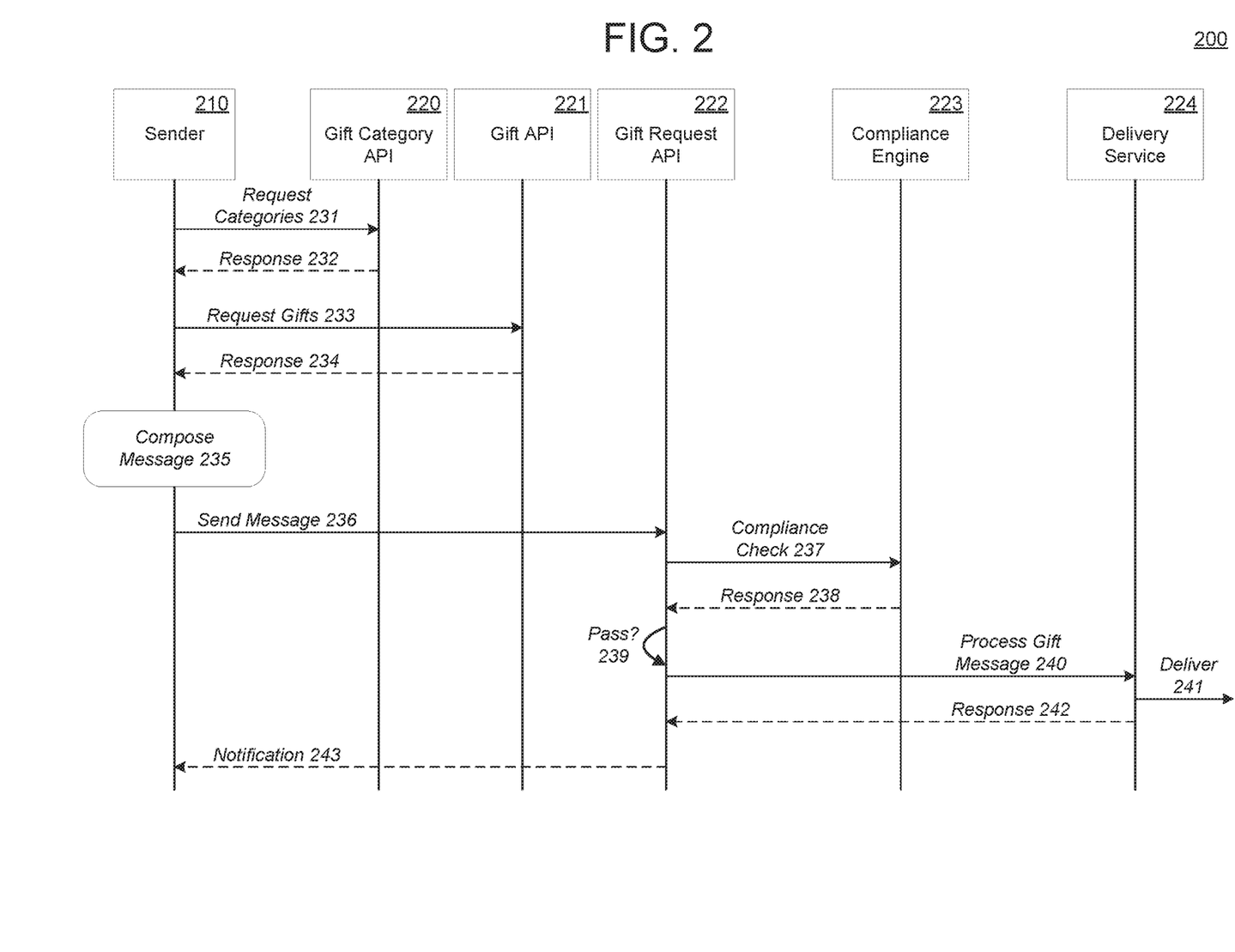
FIG. 2 is a diagram illustrating a communication sequence for composing a gratitude-based message according to example embodiments.

FIG. 2 illustrates a communication sequence 200 for composing a gratitude-based message according to example embodiments. Referring to FIG. 2, a user may login to a host system for sending a gratitude-based message to a recipient. Here, the user may be authenticated via one or more authentication protocols. The authenticated user may be a sender 210 who desires to send a gift to a recipient (not shown). In 231, the sender 210 may request a list of available gifts from the host platform (e.g., via a gift category API 220). In 232, the host platform may return a list of gift categories to the sender 210. For example, gift categories may include beverages, food, tickets, alcohol, gift cards, restaurant vouchers, and the like.

In 233, the sender 210 may select a specific category and request (e.g., via a gift API 221) the host platform for the available gifts in the that category. In 234, the host platform returns a list of available gifts in the selected category. Here, the user may compose a message 235 which includes a gift selected from the list and send the message in 236 to the host platform via a gift request API 222. In 237, the host platform may access a compliance engine 223 (e.g., via the gift request API 222) to perform a compliance check on the gift being transferred from the sender 210 to the recipient. In 238, the compliance engine may perform the compliance check and send the results back to the host platform via the gift request API 222. Here, the compliance engine 223 may be running on the host platform or it may be an independent service executing on a different platform.

In 238, the host platform determines whether the gift has passed the compliance check of the compliance rules engine 223. If so, in 240, the host platform sends the gift message to a delivery service 240 for delivery to the recipient in 241. The delivery service 223 responds to the host platform (via the gift request API 222) with notice of the delivery in 242, and the host platform forwards the notice to the sender 210, in 243.

In the example of FIG. 2, the host platform (e.g., the host platform 120) may store and execute the gift category API 220, the gift API 221, the gift request API 222, and the like. Furthermore, the compliance rules engine 223 and the delivery service 224 may be running on the host platform, but embodiments are not limited thereto. The host platform may also include logic for performing the interactions of the host platform with the sender 210, the recipient, the compliance rules engine 223, and the like.

Figure 3:
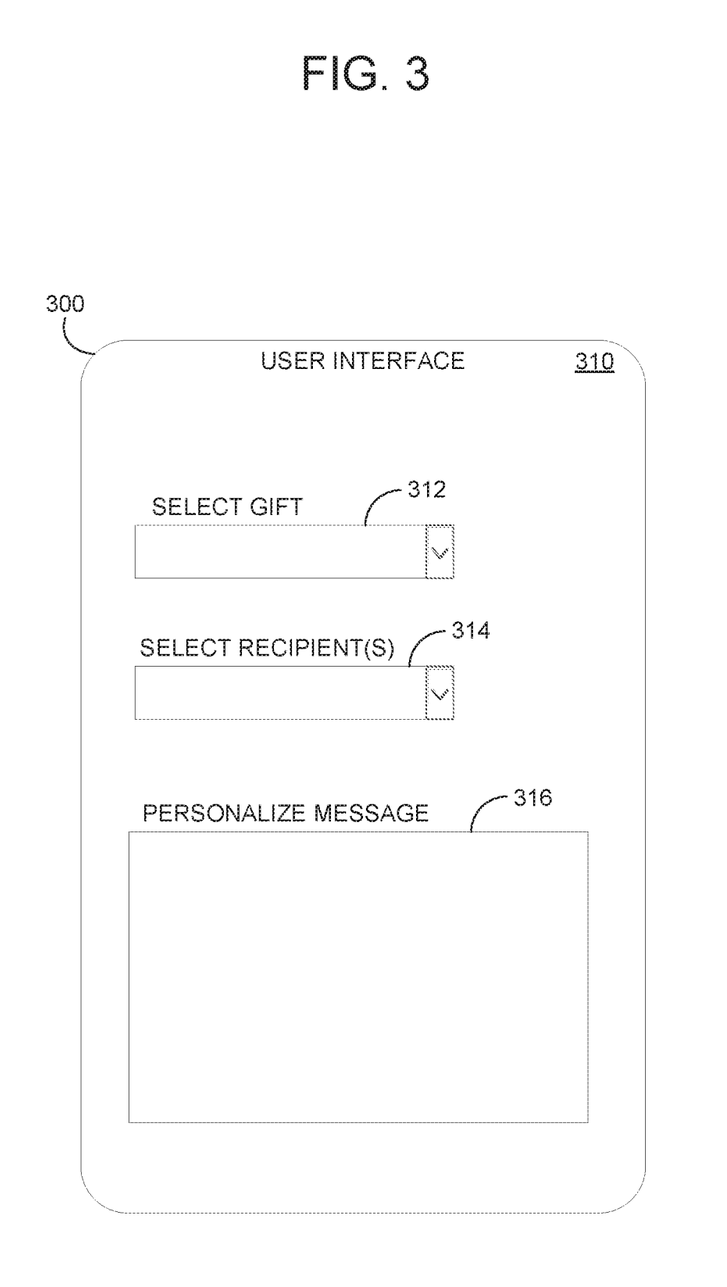
FIG. 3 is a diagram illustrating a user interface for composing a gratitude-based message according to example embodiments.

FIG. 3 illustrates a user interface 310 on a user device 300 for composing a gratitude-based message according to example embodiments. For example, the user interface 310 may be output by the host platform 120 on a display screen of the sender 110 (sender's computer, mobile device, etc.). Referring to FIG. 3, the user interface 310 includes a field 312 for selecting a gift. Here, the field 312 may include previously curated gifts that are stored on the host platform and accessible from the external gift services, or the like. The user interface 310 further includes a field 314 for selecting recipients (e.g., contacts, etc.) of the sender who is logged into the host platform. The user interface 310 also provides a field 316 which allows the user to input free-form message text into the message.

The inputs from the user interface 310 may be converted by the host platform into an electronic message, for example, an email, a SMS message, a MMS message, or the like. The host platform may convert values that are stored within the input fields 312, 314, and 316, into message content that can be delivered via a message channel which is set by default or chosen by the sender.

FIG. 4A illustrates a process 400A of determining compliance information associated with a gift according to example embodiments. Referring to FIG. 4A, the host platform may generate a structured message 410 based on content entered in the fields 312, 314, and 316 of the user interface 310 shown in FIG. 3, however, embodiments are not limited thereto. It should be appreciated that the user may generate unstructured messages in which the content is added by the user without using drop-down menus, or predefined gifts. In this example, the host platform identifies a domain name 412 of a sender of the gift and performs a compliance check based thereon. The host platform also identifies a category 414 of the gift (gift card). Other categories of gifts may include food, beverages, events, recreation, tickets, travel, alcohol, and the like.

In this example, the host platform identifies the domain name 412 of the sender. However, it should appreciated that the host platform may perform the same process for a domain name of a recipient (or multiple recipients). Also, the host platform may perform multiple compliance checks (e.g., for each of the sender and the recipient, for each of multiple recipients, and the like).

The host platform may retrieve compliance information from either the sender's compliance policy (senders domain), the recipient's compliance policy (recipient's domain), related compliance policies (other domains in the same industry), default rules specified by the host platform, and the like. In the example of FIG. 4A, the host platform access company data 420 that is linked to the domain name 412 of the sender and retrieve company-specific compliance policy rules 422 which may include files, documents, web text, PDFs, etc. As another example, the host platform may identify an industry of the company and use generic rules for that industry. Here, the host platform may retrieve general industry policy information 432 of other domains from a general data 430.

The company data 420 may include mappings between categories of gifts and specific policies. For example, a gift card may be mapped to policy A, while a restaurant meal may be mapped to policy B, or the like. As another example, some gift categories may be mapped to the same policy. Likewise, the general data 430 may include mappings between gift categories and policies.

As an example of a process performed by the host platform, the sender's domain 412 may be a company that is in the financial/banking industry. Here, the host platform may also create and access general compliance rules for the financial/banking industry based on compliance rules of other companies in the same industry which are accessible to the host platform. This way, the host platform can accommodate for missing compliance rules of a domain or ambiguous compliance rules of a domain. Accordingly, the host platform can enrich the compliance rules of a domain with general industry compliance rules.

Figure 4B:
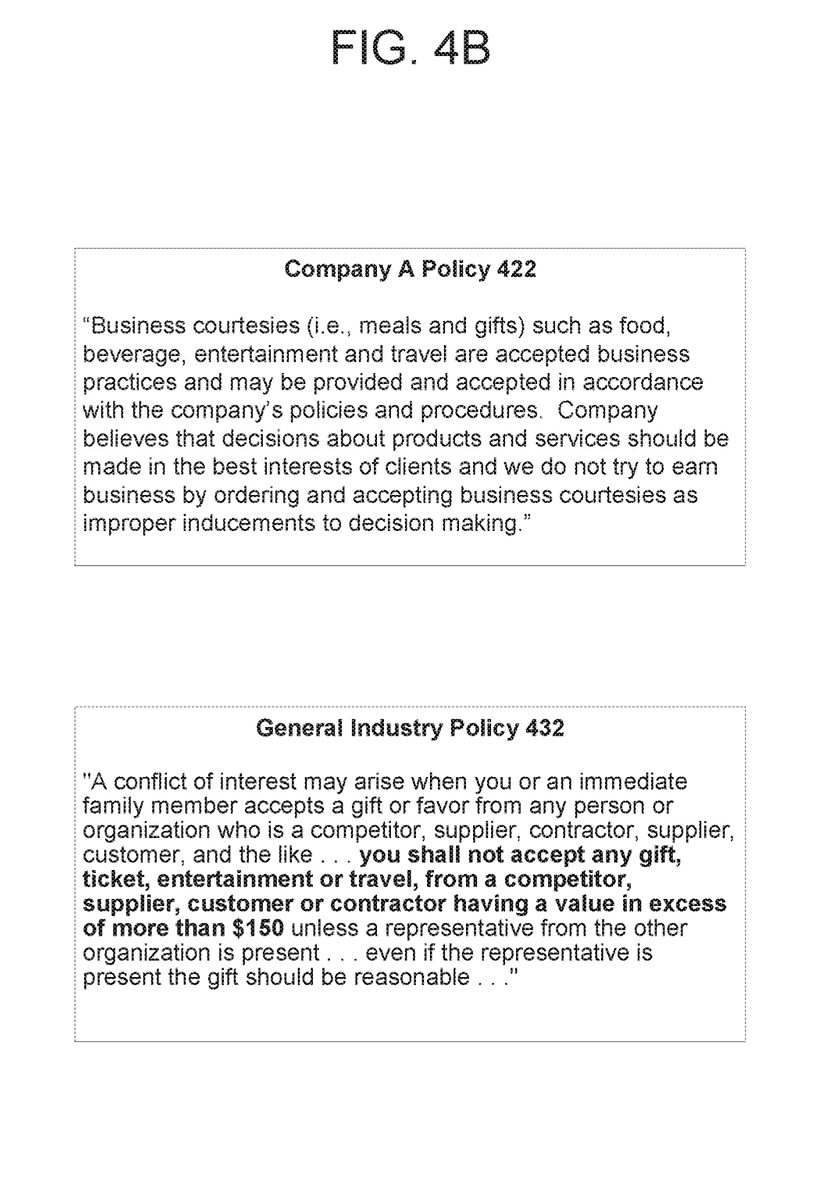
FIG. 4B is a diagram illustrating different types of compliance data according to example embodiments.

The compliance policy data 422 and 432 is further shown in FIG. 4B and includes unstructured data such as the text of the gifting policies of the company and of the industry in general. Sources of the compliance data may include company manuals, registrations, endpoints, and the like, which include company data. The compliance data may be a dynamically growing set of data. This is an information stage where the user is provided with general compliance information about gifting to the recipients domain.

The host platform can translate the unstructured data into structured data. This allows business rules to be applied to the data. In this step, the system extracts or analyzes keywords/attributes within the gift/email itself and then finds compliance information (rules) of the recipient that is associated therewith. For example, a compliancy policy may specify no alcohol, no gifts over $100, etc.

In some embodiments, the host platform may perform a cascading retrieval and analysis of the compliance data. For example, the host platform may initially retrieve compliance policies 422 from the company data 420. If this information is ambiguous, or missing, the host platform may enrich/extend the compliance rules by retrieving or falling back on general industry compliance rules 432 related to the organization such as similar companies (an average in the industry of such company types, etc.) from the general data 430. This extends to things like a cascade of compliance rules that fit into industries. So there are specific rules for this company and then there are inherent rules that apply to certain industries (financial, etc.). There is thus a cascading set of compliance rules going from specific company rules to general standards in the industry.

In addition, when the sender's company provides ambiguous language such as "nothing extravagant" and then the system can look at similar companies (use of industry analysis) and figure out an average or some sort of likelihood of what is meant by extravagant.

Prior to the gift being sent, the host platform may provide any relevant compliance information that is detected from the sender's domain, the recipient's domain, the related domain, etc. For example, the host platform may display a relevant portion/text of the compliance policy that is associated with the gift.

FIG. 4B illustrates a display of cascading compliance policy data which may be output to a screen of the user device. Referring to FIG. 4B, the host platform may initially detect and display a notification of the company-specific gifting policy 422. Here, the company-specific gifting policy 422 is ambiguous because it does not provide any specific boundaries (financial amount, item types, etc.) on what is allowed and not allowed. In this example, the host platform may extend the compliance information to include a general industry policy 432 for gifts in the same type of industry. For example, if the recipient's domain is banking-related, the organization's domain may be the specific bank. Meanwhile, the generally industry policy 432 may be the average of other banking domains (e.g., the average of five other banking domains, etc.). In this example, the generally industry policy 432 has more specific boundaries that can be used by a sender when determining whether or not to send the gift.

After displaying the notification to the sender, the sender can submit the gift via the host platform which can transmit the gift to the recipient.

Translating the unstructured data into structured data allows the sender to read the compliance requirements that are relevant to the gift. The translation into structured data may be converted into rules. (e.g., no gift in the amount of over $100, no alcohol, etc.) This extends to things like cascade of compliance rules that fit into industries. The most granular are the specific rules for the company itself, etc. The industry of the company, etc., may provide a cascading compliance rules. Other examples of interpretation of these things is use of industry analysis. The platform can look at compliance policies of other companies in the industry and combine/average them and provide some sort of median rules for the industry.

Compliance starts at the company level. For example, company policy may say that gifts (business, meals and travel) may be accepted only in the best interests of the client, etc. For translating, the system uses heuristics, expert rules (algorithm) and the application of word analysis leverages machine learning. Could be natural language processing. At a next level (cascading level) the compliance can be inherited from a generic industry policy. Accordingly, if the host platform cannot find anything that is specific at the company level, the platform can move up to the industry level. The other element is the policy data for an industry or a new company can grow. If the recipient/sender is from a new company, the platform can launch retrieval process for policy information from the new domain such as using a URL or web resource associated with the domain, a company website, etc.

Figure 5:
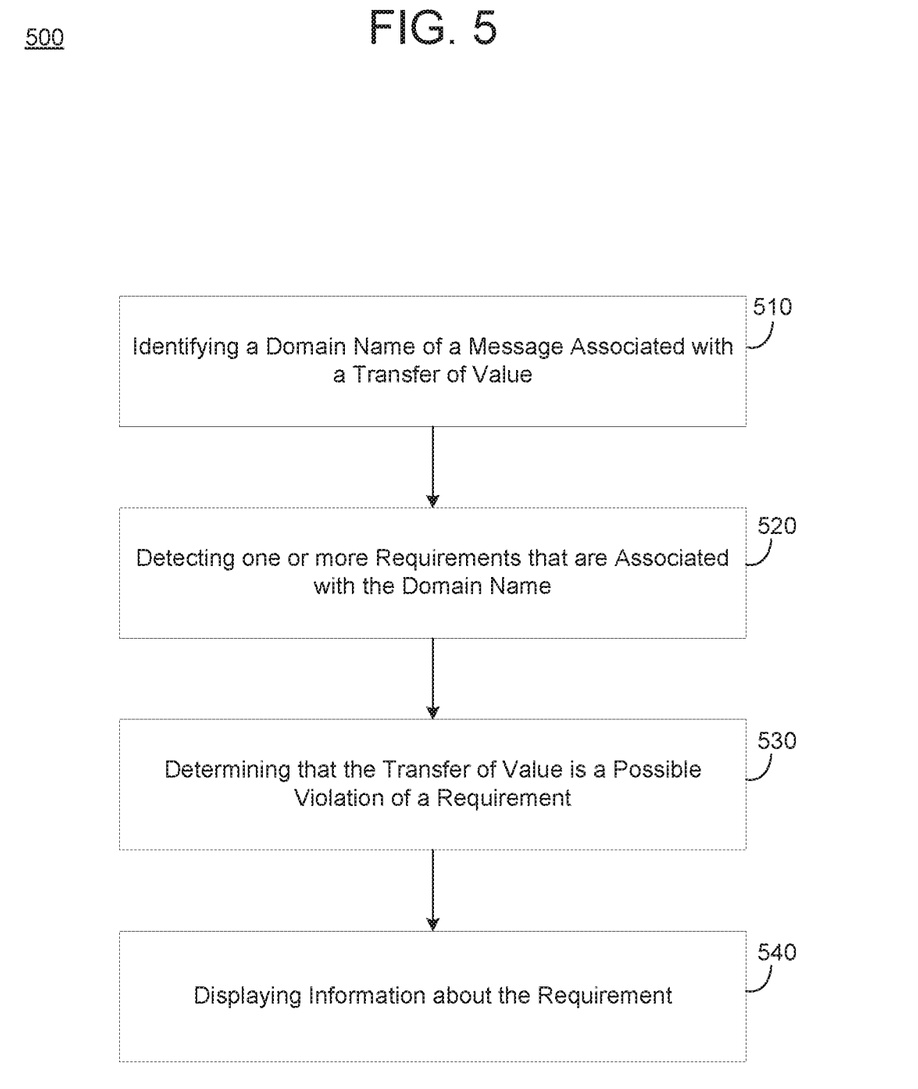
FIG. 5 is a diagram illustrating a method of performing a compliance check on a message according to example embodiments.

FIG. 5 illustrates a method 500 of performing a compliance check on a message according to example embodiments. For example, the method 500 may be performed by the host platform described herein which may be a server, a cloud platform, a database, a user device, and the like. Referring to FIG. 5, in 510, the method may include identifying a domain name from a message associated with a transfer of value from a sender to a recipient. The domain name may be read from text content within a TO field or a FROM field of the message. As another example, the domain name may be captured from registration information of the sender, the recipient, or the like.

In 520, the method may include detecting one or more requirements that are associated with the domain name identified from the message. For example, one or more corporate compliance requirements of the sender and/or the recipient may be detected based on the type of transfer of value. Here, the method may identify a mapping to compliance rules/policies of the company and/or a general industry which includes the company.

In 530, the method may include determining that the transfer of value is a possible violation of a requirement from among the one or more requirements that are associated with the domain name based on content of the requirement. Furthermore, in 530, the method may include displaying information about whether the detected requirement. For example, the compliance rules that are relevant to the gift may be displayed on the sender's screen to allow the sender to determine whether they are in violation of the compliance rules. As another option, the method may automatically detect whether the gift violates compliance requirements, and in response, prevent the message from being transmitted to the recipient.

In some embodiments, the preventing may include rerouting the message to a computing system of an administrator. In some embodiments, the method may further include extracting a classification tag embedded within the message, and the detecting may include detecting the requirement based on the extracted classification tag. In some embodiments, the method may further include receiving, via an application programming interface (API), content of the message input by the sender.

In some embodiments, the identifying may include extracting the domain name from an email address of at least one of the sender and the recipient. In some embodiments, the detecting may include detecting a requirement that is mapped to the domain name and the type of transfer of value within the database. In some embodiments, the detecting may include detecting a requirement that is mapped to an industry type that is associated with the domain name and the type of transfer of value within the database.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
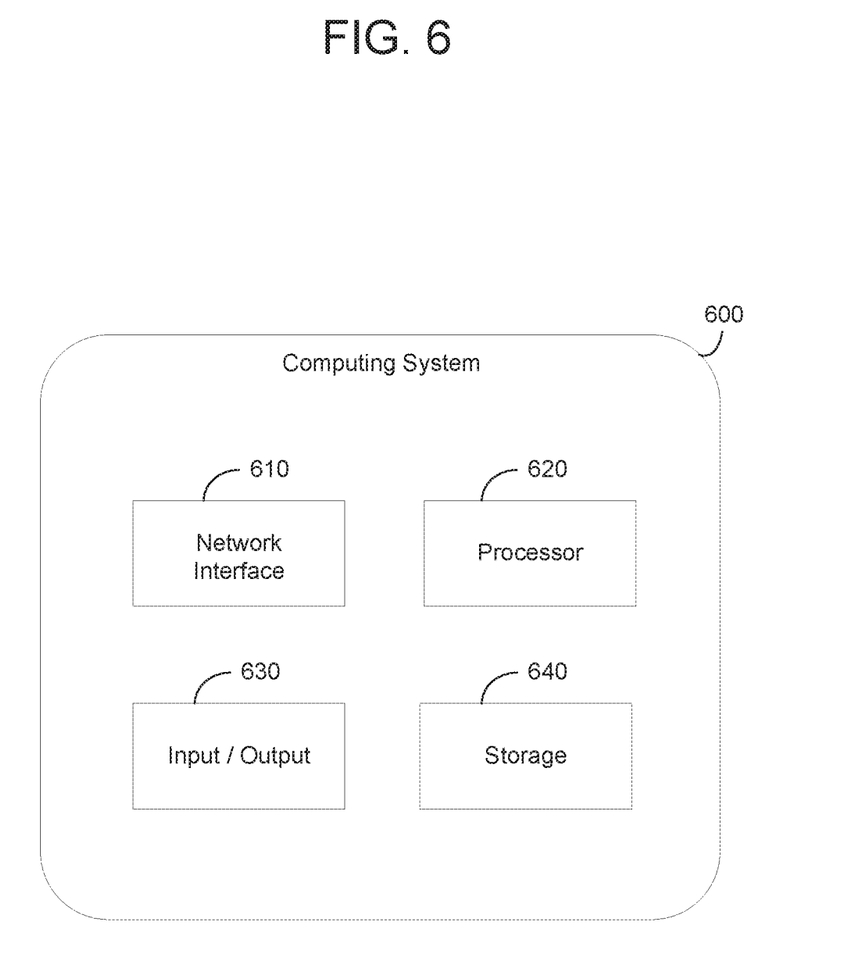
FIG. 6 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computing system 600 which may represent or be integrated in any of the above-described components, etc. For example, the computing system 600 may be the host platform, the sender, the recipient, or the like.

FIG. 6 is not intended to suggest any limitation as to the scope of use or functionality of embodiments described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 600 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 600 may be a tokenization platform, server, CPU, or the like.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 6, the computing system 600 is shown in the form of a general-purpose computing device. The components of computing system 600 may include, but are not limited to, a network interface 610, one or more processors or processing units 620, an input and/or output 630 which may include a port, an interface, etc., or other hardware, for outputting a data signal to another device such as a display, a printer, etc., and a storage device 640 which may include a system memory, or the like. Although not shown, the computing system 600 may also include a system bus that couples various system components including system memory to the processor 620.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 640 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.; one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to: microcode, device drivers, redundant processing units, external disk drive arrays, RAID systems, tape drives, and data archival storage systems, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a memory; and
   a processor communicably coupled to the memory and configured to
      identify a domain name of one or more of a sender of an electronic message and a recipient of the electronic message, wherein the electronic message includes a transfer of value from the sender to the recipient via a software application;
      map the transfer of value included in the electronic message to a compliance policy of the domain name identified from the electronic message;
      determine that the transfer of value from the sender of the electronic message is a possible violation of a requirement of the mapped compliance policy of the domain name based on content of the requirement and the transfer of value; and
      display information about the requirement of the mapped compliancy policy of the domain name via a user interface of the software application on one or more of a user device of the sender and a user device of the receiver.

2. The computing system of claim 1, wherein the processor is further configured to prevent the electronic message from being transmitted to the recipient based on the possible violation determination.

3. The computing system of claim 1, wherein the processor is configured to reroute the electronic message to a computing system of an administrator.

4. The computing system of claim 1, wherein the processor is further configured to extract a classification tag embedded within the electronic message, and map the transfer of value to the compliance policy based on the extracted classification tag.

5. The computing system of claim 1, wherein the processor is further configured to receive, via an application programming interface (API), content of the electronic message input by the sender.

6. The computing system of claim 1, wherein the processor is further configured to extract the domain name from an email address of the recipient, map the transfer of value from the sender to a compliance policy of the domain name of the recipient, and determine that the transfer of value from the sender of the electronic message is a possible violation of a requirement of the mapped compliance policy of the domain name of the recipient based on content of the requirement and the transfer of value.

7. The computing system of claim 1, wherein the processor is configured to detect Hall an additional requirement that is mapped to an industry type associated with the domain name and mapped to the type of transfer of value.

8. A method comprising:
   identifying a domain name of one or more of a sender of an electronic message and a recipient of the electronic message, wherein the electronic message includes a transfer of value from the sender to the recipient via a software application;
   mapping the transfer of value included in the electronic message to a compliance policy of the domain name identified from the electronic message;

determining that the transfer of value from the sender of the electronic message is a possible violation of a requirement of the mapped compliance policy of the domain name based on content of the requirement and the transfer of value; and displaying information about the requirement of the mapped compliancy policy of the domain name via a user interface of the software application on one or more of a user device of the sender and a user device of the receiver.

9. The method of claim 8, further comprising preventing the electronic message from being transmitted to the recipient based on the possible violation determination.

10. The method of claim 8, wherein the preventing comprises rerouting the electronic message to a computing system of an administrator.

11. The method of claim 8, wherein the method further comprises extracting a classification tag embedded within the electronic message, and mapping the transfer of value to the compliance policy based on the extracted classification tag.

12. The method of claim 8, wherein the method further comprises receiving, via an application programming interface (API), content of the electronic message input by the sender.

13. The method of claim 8, wherein the identifying comprises extracting the domain name from an email address of the recipient mapping the transfer of value from the sender to a compliance policy of the domain name of the recipient, and determining that the transfer of value from the sender of the electronic message is a possible violation of a requirement of the mapped compliance policy of the domain name of the recipient based on content of the requirement and the transfer of value.

14. The method of claim 8, wherein the detecting comprises detecting an additional requirement that is mapped to an industry type associated with the domain name and mapped to the type of transfer of value.

15. A non-transitory computer-readable medium comprising instructions which when executed by a processor cause a computer to perform a method comprising:

identifying a domain name of one or more of a sender of an electronic message and a recipient of the electronic message, wherein the electronic message includes a transfer of value from the sender to the recipient via a software application;

mapping the transfer of value included in the electronic message to a compliance policy of the domain name identified from the electronic message;

determining that the transfer of value from the sender of the electronic message is a possible violation of a requirement of the mapped compliance policy of the domain name based on content of the requirement and the transfer of value; and displaying information about the requirement of the mapped compliancy policy of the domain name via a user interface of the software application on one or more of a user device of the sender and a user device of the receiver.

16. The non-transitory computer-readable medium of claim 15, wherein the method further comprises preventing the electronic message from being transmitted to the recipient based on the possible violation determination.

17. The non-transitory computer-readable medium of claim 15, wherein the preventing comprises rerouting the electronic message to a computing system of an administrator.

18. The non-transitory computer-readable medium of claim 15, wherein the method further comprises extracting a classification tag embedded within the electronic message, and mapping the transfer of value to the compliance policy based on the extracted classification tag.

* * * * *